(No Model.)
M. B. BARTLETT.
AUTOMATIC WEIGHING SCALES.
No. 418,882. Patented Jan. 7, 1890.
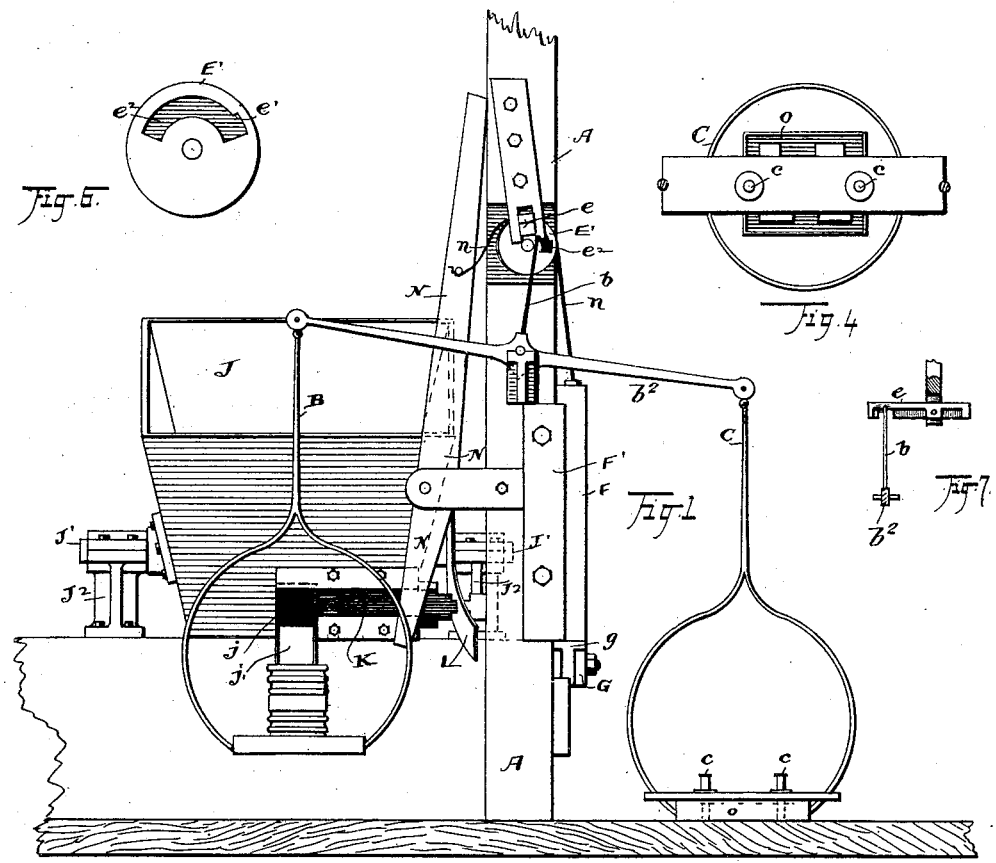
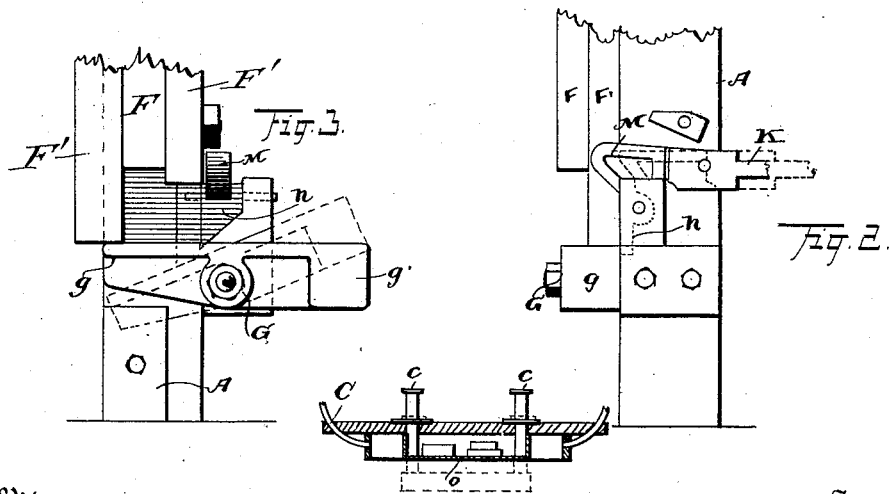
Witnesses
N. H. Fay
J. D. Fay
Inventor
M. B. Bartlett
By his Attorney
Thos. J. Hall

UNITED STATES PATENT OFFICE.

MARCUS B. BARTLETT, OF NEWBURG, OHIO.

AUTOMATIC WEIGHING-SCALES.

SPECIFICATION forming part of Letters Patent No. 418,882, dated January 7, 1890.

Application filed June 15, 1889. Serial No. 314,479. (No model.)

*To all whom it may concern:*

Be it known that I, MARCUS B. BARTLETT, a citizen of the United States, and a resident of Newburg, county of Cuyahoga, and State of Ohio, have invented certain new and useful Improvements in Automatic Scales, of which the following is a specification, the principle of the invention being herein explained and the best mode in which I have contemplated applying that principle so as to distinguish it from other inventions.

The object of my invention is the automatic and accurate weighing of powder and other like articles.

In weighing powder and other like articles that are fed from or discharged from a hopper it is desirable to weigh with accuracy and also to economize labor in the weighing. If, in weighing, the hopper is not closed until the weight of powder in the weighing scale-pan is equal to the weight in the weight scale-pan, then after the weight of powder in transit between the hopper and the weighing scale-pan is added to the latter it will overrun the weight of the weight scale-pan, and loss will result to the manufacture. On the other hand, if an attempt is made to accurately gage the amount of powder thus habitually in transit and allow for the same, great difficulty is encountered, for the reason that when the hopper is full the powder will run more rapidly than if the hopper were nearly empty. Again, certain classes of powder run more freely than others, owing to the difference in the size of the grains, &c. Therefore any allowance for the powder thus in transit as the weighing-scale descends must be easily adjustable, if accuracy is desired, and this my machine accomplishes.

With my improved apparatus I not only insure accuracy, but also cause the discharging powder to be shut off automatically, thus putting it beyond the power of careless workmen to overrun the weight, and thus waste the powder.

Referring to the drawings, Figure 1 is a front elevation view of the weigher. Fig. 2 is a detail view of a portion of the tripping device. Fig. 3 is a side detail view of a portion of the tripping device. Fig. 4 is a detail plan view of the weight scale-pan. Fig. 5 is a central sectional view of the weight scale-pan. Fig. 6 is a face view of the wheel $E'$, over which the cord runs and to which it is attached. Fig. 7 is a detail view of index $b$ and engaging parts.

A is a post of any convenient form, as the post supporting the roof of the powder-weighing room. In a lug projecting from said post is balanced the beam $b^2$ of the scales, which are respectively provided with the weighing scale-pan B and the weight scale-pan C. An index $b$ projects upwardly from the center of said beam (see Figs. 1 and 7) and engages with the under side of the pivotal lever $e$, whose inner extremity catches in the recess $e'$ of the slot $e^2$ of the rotary wheel $E'$, said wheel being pivotally secured to the said post. The weight F has a sliding movement in the runways $F'$. The lower extremity of said weight, when in lowered position, has engagement with and presses downward the forward extremity $g$ of the trip G, that is pivoted forward of its center, the outer extremity $g'$ of said trip acting as a weight. A lug $h$ is pivoted to the post A, and its lower extremity is in engagement with and held in position by the trip G. As the weight F strikes the trip G the forward extremity of the latter is freed from engagement with the lug $h$, and permits said lug to be pivotally moved backwardly by the hook M, which thereupon slides off, as hereinafter described.

Hopper J, located in proximity to the scales, is provided with the discharge-orifice $j$ and the spout $j'$, which leads to the bucket or other receptacle resting on the weighing scale-pan. Slide K has sliding movement across the said orifice, and engaging with this slide is the spring L, that is attached at one end to the body of the hopper. A pivotal hook M is attached at one end to the slide, its free extremity engaging with the pivotal lug $h$, and lever N, pivotally secured to the post, has its lower end in the same plane with the free end of the spring, and is adapted to press said spring back, thereby permitting the discharge-orifice of the hopper to remain open.

To the upper end of said lever a cord $n$ is attached, said cord running over the wheel E', and thence passing down to the weight F, to both of which it is attached. Secured to the weight scale-pan by means of pins $c$ is the secondary scale-pan $o$, in which rests the suspended weight, a plan view of said scale-pan being shown in Fig. 4. Said pins have easy sliding movement through the bottom of the weight-scale, so that they project through the weight scale-pan when the latter is in lowered position, and both the weight scale-pan and the said secondary balance may rest on the floor at the same time; but by reason of the length of said pins and their sliding movement in the weight scale-pan the latter may rise a certain distance before the secondary scale-pan moves from its position on the floor.

The hopper J is provided on each side with the journals J', that are respectively journaled in the uprights $J^2$. By means of this journaling the hopper may be tilted back and more easily and readily filled than when in its normal position.

The slide K is made of gutta-percha, and this is of great importance in scales for weighing powder, as of course iron would not answer the purpose, as it could not be safely used owing to the danger of firing the powder, while wood is not hard enough to stand the continual wear of sliding, and would not be as apt to shut the powder off quickly and cleanly. Another advantage of gutta-percha is that powder does not stick to it as it does to wood or metal, and hence it does not collect on it and prevent free sliding. I therefore also preferably make the spout of gutta-percha.

The operation of the machine is as follows: The hopper is filled with powder, a pail or other receptacle is placed on the weighing scale-pan, and the weight is placed on the weight-scale, said weight being divided so that a portion of it is placed on the secondary or suspended weight scale-pan, the weight in said secondary scale-pan being about equal to the weight of the powder which it is thought will be usually in transit when the slide closes the opening in the hopper. The lower end of lever N is pressed against the spring, forcing the same backward and withdrawing the slide, which permits the powder in the hopper to pass out into the receptacle on the weighing scale-pan. When the weight on the weighing scale-pan equals the weight on the primary weight-scale, the two scales are in equilibrium and the index $b$ points vertically upward. As the weighing scale-pan descends, the index engages with the under side of the pivotal lever $e$, whose inner extremity fits in the recess $e'$ of the slot $e^2$ of the rotary wheel E'. The index moving toward the weighing scale-pan disengages said lever $e$ from the wheel, whereupon the weight F, which has up to this time been suspended by the cord $n$, attached to the wheel, is free to drop, and in falling strikes the outer extremity of the trip G, thus freeing the lower extremity of the lug $h$. The movement of this lug permits the pivotal hook M, that is attached to the slide, to free itself from the lug, whereupon the force of the spring L drives the slide $k$ across the orifice in the hopper, cutting off further egress of the powder. Meanwhile the powder that is in the mouth of the spout and in the air intermediate of the spout and the powder in the weighing scale-pan has descended and added its weight to the weight of the weighing scale-pan. This additional weight, being equal to the weight in the secondary weight scale-pan or suspended scale-pan raises the primary scale up still higher, and the secondary scale is also suspended.

In case sufficient allowance has not been made for the powder in transit, one or more slugs or small weights may be removed from the primary weight scale-pan and transferred to the secondary, thus lightening the primary scale-pan and permitting the slide to be closed so much the sooner, or, in case of the weight running under, the slugs may be transferred to the primary scale-pan. By thus regulating it the exact weight desired may be secured automatically.

The foregoing description and accompanying drawings set forth in detail mechanism in embodiment of my invention. Change may be made therein provided the principles of construction respectively recited in the following claims are employed.

I therefore particularly point out and distinctly claim as my invention—

1. In scales, the combination of a hopper J, having a slide K, adapted to close it, a weight scale-pan B, and a weighing scale-pan C, the latter provided with a secondary weighing scale-pan O, suspended from said pan by pins $c$, an intermediate lever, weight and spring mechanism connecting said scale-pan with said slide, whereby the slide may close the hopper when the primary weighing scale-pan is lifted, substantially as set forth.

2. In scales, the combination of a hopper, scale-pans B C, carrying index $b$, wheel E', lever $e$, engaging with said wheel and index, weight F, slide K, and intermediate mechanism connecting said weight and slide, substantially as set forth.

3. In scales, the combination of a hopper, a slide, a hook engaging with the latter, a weight, trip-connection connecting said weight and hook, and a scale-pan intermediately connected with said weight, substantially as set forth.

4. The combination of a hopper provided with a discharge-orifice, a slide adapted to cover the same, a spring engaging with said slide, a tripping device adapted to hold said slide withdrawn from said discharge-orifice against the pressure of the spring, a weighing-scale, and mechanism connecting said scale and tripping device, whereby as said scale is depressed the tripping device is released and the spring operates to force said slide over the discharge-orifice, substantially as set forth.

In testimony that I claim the foregoing to be my invention I have hereunto set my hand this 10th day of June, A. D. 1889.

MARCUS B. BARTLETT.

Witnesses:
J. B. FAY,
N. H. FAY.